Sept. 16, 1952     R. F. HUNTER     2,610,740
FILTER FOR COOKING FATS
Filed Dec. 13, 1950
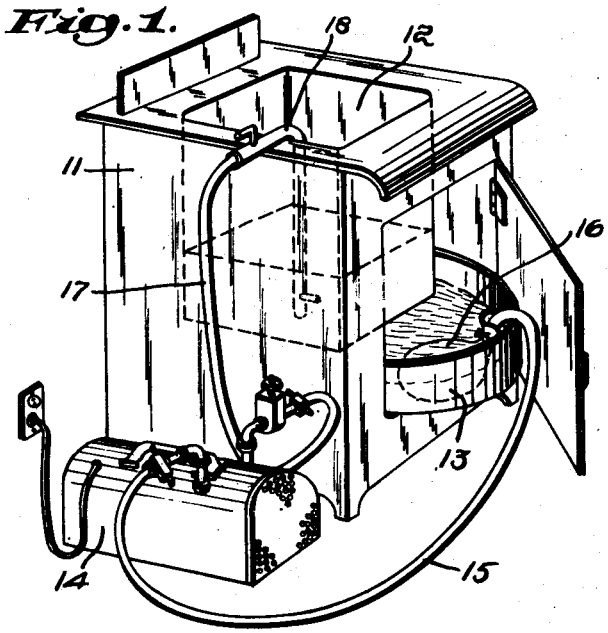
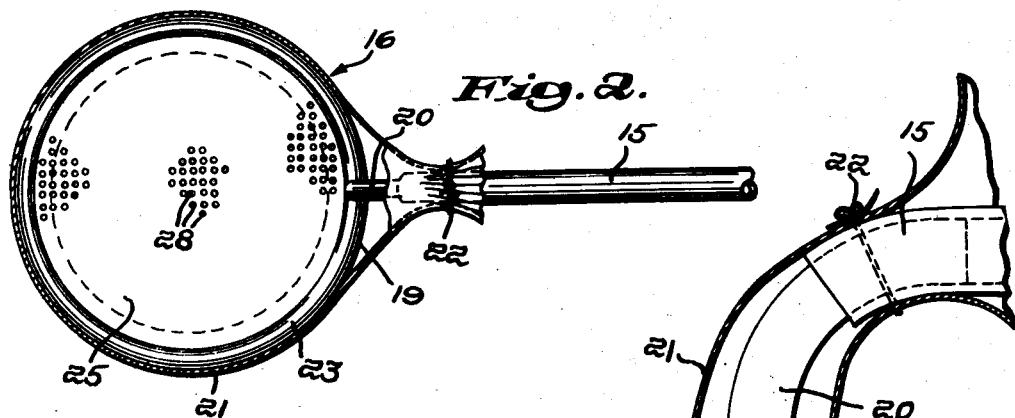
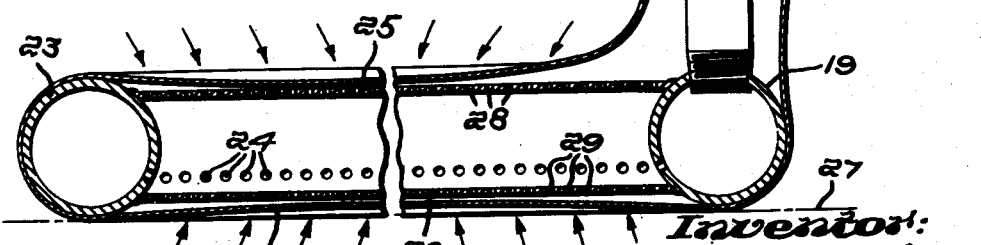
Inventor:
Robert F. Hunter,
by Thomson & Thomson
Attorneys Patented Sept. 16, 1952

2,610,740

UNITED STATES PATENT OFFICE 2,610,740

FILTER FOR COOKING FATS

Robert F. Hunter, Quincy, Mass.

Application December 13, 1950, Serial No. 200,567

1 Claim. (Cl. 210—94)

This invention relates to filters for edible fats and oils and pertains more particularly to improvements in filters used in straining sediment from fats or oils used in and drained from commercial fat friers, so that the filtered cooking fat may be reused in the frier.

The principal purpose of the invention is to provide portable oil filtering apparatus which is of relatively simple and economical construction and which may be used at the deep fat frier to eliminate contamination and reclaim edible cooking fats or oils, without pouring or handling the hot fat and without danger of damage from pressure blow-ups. A further object of the invention is to provide a filter device which is simple to operate, efficient in use, and easy to clean; and which may be used successively with several friers, each day.

The novel features of the improved filter will be apparent from the following description of the recommended embodiment of the invention shown in the accompanying drawing, and will be pointed out in the appended claim. It will be understood, however, that the structural details of the filtering apparatus herein illustrated and described may be varied to suit particular conditions without departing from the essence of the invention as set forth in said claim.

In the drawings,

Fig. 1 is a perspective view of the improved filtering apparatus associated with a conventional deep fat frier, in position to filter hot oil drained from the cooking chamber and redelivering the filtered and clarified fat to the cooking chamber;

Fig. 2 is a fragmentary plan view, partly broken away and in section, of the filter which is placed in the drained fat; and Fig. 3 is an enlarged diametrical section, partly in elevation of the filter and its connections shown in Fig. 2.

The filtering apparatus is used in connection with a deep fat frier 11 of any ordinary or conventional type, having a cooking chamber 12 and equipped with a conventional receptacle or basin 13 which receives hot fat drained from the chamber 12, after the fat has been contaminated by sediment and water during the frying operation. The apparatus comprises a suction pump 14 which may be of any usual construction, a hose line 15 connecting the pump to a filter 16 placed in the receptacle 13, and a hose line or conduit 17 connecting the pump to a delivery pipe 18 placed in the frying chamber 12.

The present invention relates primarily to the construction of the filter 16 which is placed as aforesaid in the bottom of the receptacle 13 containing hot, contaminated cooking fat or oil. This filter comprises a metal frame or filter leaf 19 consisting of a rigid pipe or conduit of circular or other peripheral shape; a pipe union 20 communicating with the interior of the filter pipe 19 and also connected to the suction hose 15; and a flexible filter bag 21 of fine mesh cotton duck or the like, removably applied over and enclosing the filter leaf, the mouth of the bag 21 being tightly bound around the hose 15 as by a cord 22.

The ring or conduit portion 23 of the filter leaf, enclosed by the bag 21, is adapted to rest on the bottom of the chamber 13. The inner periphery of the ring 23 is provided with a row of spaced openings 24, disposed around the lower portion of the inner wall of the ring; and perforated metal plates 25 and 26 are secured within the ring adjacent the top and bottom portions thereof, in spaced, substantially parallel relation, on opposite sides of the row of openings 24. The bottom plate 26 should be spaced inwardly with respect to the bottom of the ring 23, so that said plate is spaced from the receptacle bottom, indicated at 27 in Fig. 3, when the filter leaf rests flatwise thereon. The spacing between the plate 26 and the bottom of the chamber should nevertheless be minimized, so that substantially all of the oil in the receptacle will be sucked out through the apertured filter pipe 19, the union 20, and the hose 15.

The filter leaf, including the pipe ring 23 and the plates 25 and 26, constitute a frame which prevents collapsing of the fabric filter bag 21, while the fat oil is being drawn from the receptacle 13 by operation of the pump 14. The bag constitutes the primary filtering element of the device, but the perforated plates 25 and 26 provide secondary filtering elements, for the perforations 28 and 29 through the respective plates are relatively small and numerous. It will be understood that the hot oil in the chamber 13 is withdrawn through the filter by the suction pump 14, passing first through the bag 21, then through the perforated plates 25 and 26, then through the openings 24 of the ring and finally through the union 20, hose 15, pump 14, and hose 17, to the frying chamber 12 of the deep fat frier 11.

After the filter leaf and its enclosing fabric bag is deposited in the receptacle 13 containing used fat, and before the pump 14 is operated, a cleaning compound preferably comprising diatomaceous earth is placed in the drained fat. This compound settles and coats the bag 12, partially filling or bridging its pores, and thus contributes to the efficiency of the filter in preventing the passage of water or sediment through the bag. The pump 14 is then operated by a conventional electric motor, as suggested in Fig. 1, or by other suitable means.

The filtering operation removes substantially all of the sediment and water in the hot, contaminated fat and delivers clarified fat to the frier. When the oil in one frier has thus been reclaimed, the filtering apparatus may be easily moved to another deep fat frier for cleaning the drained oil therein; and it has been found that this filter may be successively used, each day for many days, with several friers, without cleaning the filter. The use of the improved filter avoids any danger of splashing hot fat, inasmuch as the fat need not be poured out of the drainage receptacle 13, and the danger of hot fat blow-ups which sometimes occur when the hot fat is pressure pumped from a drainage receptacle.

The improved filter is readily cleaned by knocking off accumulated deposits on the outer surface of the bag 21, and the necessity for such cleaning is infrequent when the cleaning compound is used in the fat at each operation. Any fat remaining within the filter leaf, or in its connections, may be blown out by connecting the hose 15 to the outlet side of the suction pump, but this procedure is seldom necessary. The use of the improved filter thus affords substantial savings in the expense of edible fats used in frying doughnuts, clams, French fried potatoes, or the like, by providing handy filtering means which cleans the fats for reuse, in a safe, efficient, and convenient manner.

I claim:

In apparatus for filtering cooking fat drained into a receptacle, a filter removably disposable on the bottom of said receptacle and comprising a metal frame including a ring conduit of tubular cross-section, said conduit having openings in its inner wall, perforated plates disposed in spaced, substantially parallel relationship across the center of said ring conduit and on opposite sides of the plane of said openings, at least one of said plates being disposed in a plane spaced inwardly from the adjacent exterior surface plane of said ring conduit, a hose connected to said conduit, and a flexible fabric bag enclosing said frame and having its mouth constricted around said hose, the outer surface of said bag being coated with a composition comprising diatomaceous earth.

ROBERT F. HUNTER.

REFERENCES CITED

The following references are of record in the file of this patent:

UNITED STATES PATENTS

| Number | Name | Date |
|---|---|---|
| 1,548,271 | Lane | Aug. 4, 1925 |
| 1,690,958 | Vallez | Nov. 6, 1928 |
| 1,735,007 | Lanes | Nov. 12, 1929 |